United States Patent
Nelgner et al.

(10) Patent No.: US 11,007,577 B2
(45) Date of Patent: May 18, 2021

(54) SYSTEM AND METHOD FOR ROTATIONAL POSITION TRACKING OF BRAKE LATHE ADJUSTMENT ASSEMBLY

(71) Applicant: Hunter Engineering Company, St. Louis, MO (US)

(72) Inventors: William James Nelgner, St. Charles, MO (US); Jeffrey P. Talbott, Florissant, MO (US); Joel A. Clasquin, Highland, IL (US)

(73) Assignee: HUNTER ENGINEERING COMPANY, St. Louis, MO (US)

( * ) Notice: Subject to any disclaimer, the term of this patent is extended or adjusted under 35 U.S.C. 154(b) by 0 days.

(21) Appl. No.: 16/530,199

(22) Filed: Aug. 2, 2019

(65) Prior Publication Data
US 2019/0351489 A1   Nov. 21, 2019

Related U.S. Application Data

(63) Continuation of application No. 15/598,031, filed on May 17, 2017, now Pat. No. 10,456,839.

(60) Provisional application No. 62/351,081, filed on Jun. 16, 2016.

(51) Int. Cl.
  *B23B 5/04* (2006.01)
  *G01B 7/31* (2006.01)
  *G01D 5/14* (2006.01)

(52) U.S. Cl.
  CPC ............ *B23B 5/04* (2013.01); *G01B 7/31* (2013.01); *B23B 2235/04* (2013.01); *B23B 2235/21* (2013.01); *B23B 2260/128* (2013.01); *B23B 2270/48* (2013.01); *G01D 5/145* (2013.01)

(58) Field of Classification Search
  CPC .... B23B 5/04; B23B 5/02; B23B 5/08; B23B 5/12; B23B 2235/04; B23B 2235/21; B23B 2260/128; B23B 2270/48
  See application file for complete search history.

(56) References Cited

U.S. PATENT DOCUMENTS

| | | | |
|---|---|---|---|
| 3,456,401 A | 7/1969 | Kushmuk | |
| 3,592,088 A | 7/1971 | Welling | |
| 4,455,900 A | 6/1984 | Callanan | |
| 4,478,116 A | 10/1984 | Fuller | |
| 5,765,457 A * | 6/1998 | Meyer | B23B 5/02 82/112 |

(Continued)

*Primary Examiner* — Nicole N Ramos
(74) *Attorney, Agent, or Firm* — Sandberg Phoenix & von Gontard, P.C.

(57) ABSTRACT

An on-car brake lathe is provided with a runout compensation system configured to monitor the rotational position of a pair of slant discs within an aligning joint of the on-car brake lathe. The system monitors the amount of runout present between the rotating components of the on-car brake lathe and the wheel hub to which the on-car brake lathe is secured, and calculates a relative rotational position for each slant disc within the aligning joint required to impart a necessary adjustment in the wheel coupling rotational axis to align the on-car brake lathe with the rotational axis of the wheel hub. An adjustment mechanism within the aligning joint is configured to rotationally drive each slant disc to the calculated relative rotational positions with a minimum amount of rotational movement based on the current relative rotational position of each slant disc and the required calculated relative rotational positions.

11 Claims, 11 Drawing Sheets

(56) References Cited

U.S. PATENT DOCUMENTS

| | | | |
|---|---|---|---|
| 5,974,878 A | 11/1999 | Newell et al. | |
| 6,050,160 A | 4/2000 | Newell et al. | |
| 6,101,911 A | 8/2000 | Newell et al. | |
| 6,216,571 B1 | 4/2001 | Newell et al. | |
| 6,327,947 B1 | 12/2001 | Newell et al. | |
| 6,330,847 B2 | 12/2001 | Newell et al. | |
| 6,363,821 B1 * | 4/2002 | Greenwald | B23B 5/04 82/1.11 |
| 6,474,203 B1 | 11/2002 | Newell et al. | |
| 6,477,928 B2 | 11/2002 | Newell et al. | |
| 6,626,073 B1 | 9/2003 | Cunningham et al. | |
| 6,813,979 B2 | 11/2004 | Caorle | |
| 6,895,841 B2 | 5/2005 | Newell et al. | |
| 7,007,575 B2 | 3/2006 | Newell et al. | |
| 7,270,037 B2 | 9/2007 | Newell et al. | |
| 7,334,510 B2 * | 2/2008 | Gerdes | B23B 5/04 82/1.11 |
| 7,337,699 B2 | 3/2008 | Newell et al. | |
| 7,536,935 B2 | 5/2009 | Greenwald | |
| 7,536,936 B2 | 5/2009 | Gerdes et al. | |
| 7,607,377 B1 | 10/2009 | Greenwald | |
| 7,640,832 B2 | 1/2010 | Gerdes et al. | |
| 7,861,625 B2 | 1/2011 | Greenwald et al. | |
| 8,245,609 B1 * | 8/2012 | Greenwald | G05B 19/409 82/112 |
| 8,707,835 B2 | 4/2014 | Bakker | |
| 2001/0000378 A1 * | 4/2001 | Newell | B23B 5/04 82/1.11 |
| 2003/0000352 A1 | 1/2003 | Caorle | |
| 2011/0113937 A1 | 5/2011 | Bakker | |

\* cited by examiner

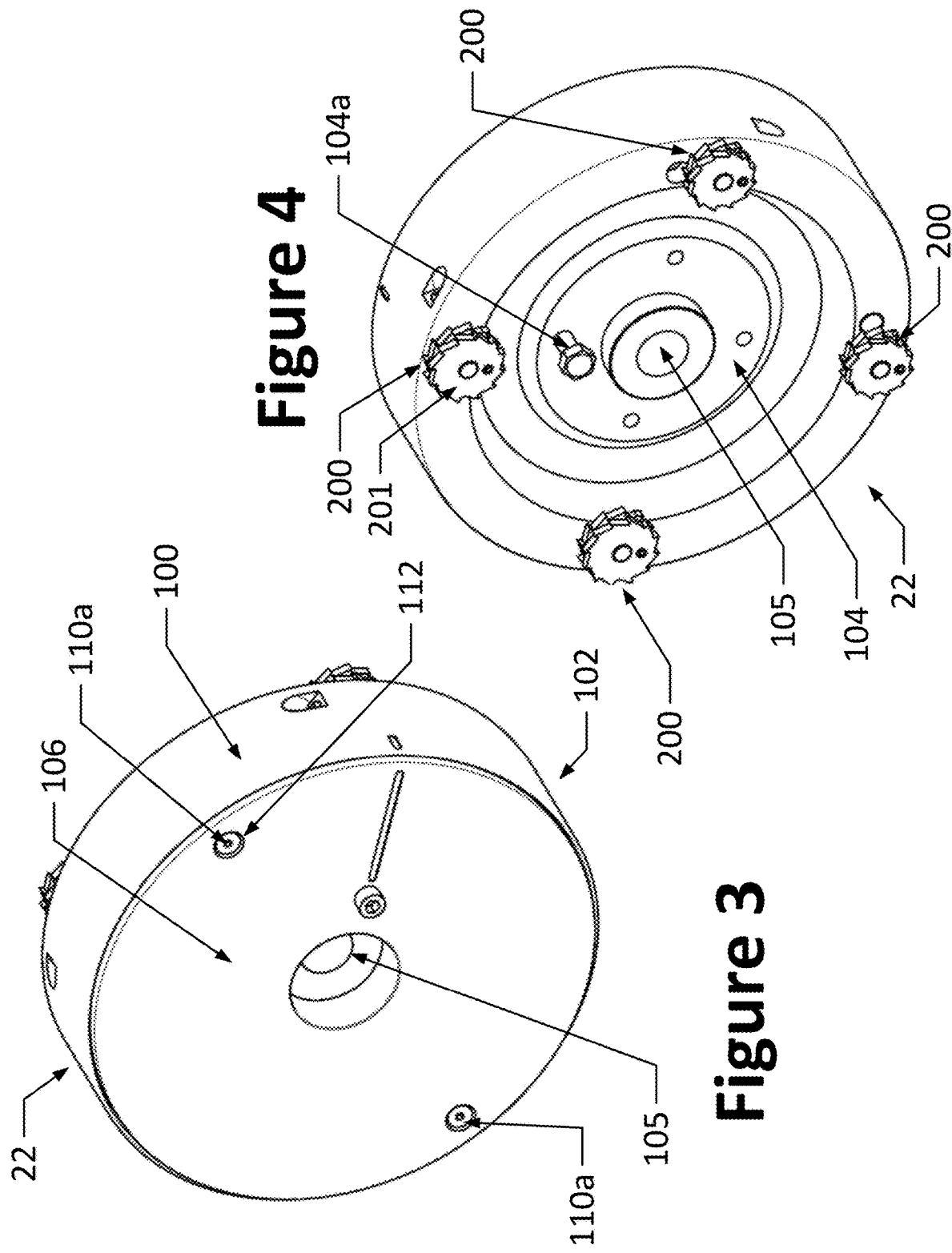

SYSTEM AND METHOD FOR ROTATIONAL POSITION TRACKING OF BRAKE LATHE ADJUSTMENT ASSEMBLY

CROSS-REFERENCE TO RELATED APPLICATIONS

The present application is a continuation of co-pending U.S. patent application Ser. No. 15/598,031 filed on May 17, 2017, which in turn is related to, and claims priority from, U.S. Provisional Patent Application Ser. No. 62/351,081 filed on Jun. 16, 2016. Each of the aforementioned applications are herein incorporated by reference.

STATEMENT REGARDING FEDERALLY SPONSORED RESEARCH

Not Applicable.

BACKGROUND OF THE INVENTION

The present invention relates to automotive vehicle brake lathes configured for resurfacing brake rotor components, and in particular, to an improved on-car brake lathe apparatus and a method for compensating for runout between an on-car brake lathe and a vehicle wheel hub to which the on-car brake lathe is secured for a brake rotor resurfacing operation.

One of the main components of a vehicle wheel braking system employing disc brakes are the brake rotors, which provide a solid rotating surface against which the stationary brake friction pads are clamped or compressed to generate a frictional force, slowing the rotational movement of the brake rotors and the associated vehicle wheels. The brake rotors are subjected to frequent and substantial frictional forces by the brake friction pads, and over time, become worn. Uneven application of braking force, debris, or uneven frictional surfaces on the brake friction pads can result in the formation of grooves, channels, or scratches in the surfaces of the brake rotors. Repeated heating and cooling of the brake rotors resulting in extreme temperature variations can additionally result in a lateral warping of the brake rotors.

A worn or warped brake rotor may be resurfaced by cutting or grinding to provide a uniform smooth brake friction pad contact surface if sufficient brake rotor material remains to provide an adequate braking surface without compromising the structural integrity of the vehicle braking system. However, once a brake rotor has been worn below a minimum safe thickness, it is unable to safely dissipate the heat generated during brake application, and must be replaced.

To provide for a uniform surface, any abnormalities in the brake rotor, such as a lateral warping, must be removed during the resurfacing procedures. Additional sources of lateral warping defects in a brake rotor include over tightened attachment bolts or uneven mounting surface onto which the brake rotor is secured in the vehicle wheel assembly. If the brake rotor is removed from the vehicle wheel assembly for a resurfacing operation on a fixed or "bench" brake lathe, any abnormalities or defects resulting from the mounting of the brake rotor to the vehicle wheel assembly may not be accurately identified or corrected during the resurfacing procedure. Accordingly, a variety of brake resurfacing machines or brake lathes have been developed to resurface brake rotors while they remain mounted to the vehicle wheel assembly.

Brake resurfacing machines or brake lathes configured to resurface brake rotors mounted to a vehicle wheel assembly are commonly referred to as on-car brake lathes. Examples of an on-car brake lathe include the OCL-series brake lathes sold by Hunter Engineering Co. of St. Louis, Mo. By eliminating the need to remove the brake rotor from the vehicle wheel assembly, the overall efficiency of the resurfacing procedure is improved, and the chances for operator induced error are reduced. However, the resurfacing of brake rotors which remain mounted to the vehicle wheel assembly requires that the on-car brake lathe and the vehicle wheel assembly, including the brake rotor, be aligned for rotation along a common axis, typically, the rotational axis of the vehicle wheel assembly hub onto which the on-car brake lathe is secured.

Often, the hub surface to which the vehicle wheel assembly mounts is not aligned within a required tolerance to the axis of rotation for the axle upon which the vehicle wheel assembly is secured. This deviation between the hub surface and the axis of rotation for the wheel assembly is referred to as lateral, or axial, runout, or axis misalignment, and must be compensated for either manually or automatically before beginning the resurfacing procedures with the on-car brake lathe.

Some manual runout compensation procedures are tedious and complex. First, an operator secures the output spindle of the on-car brake lathe to the vehicle wheel hub using a suitable adapter. Next, a motor in the on-car brake lathe is activated to rotate the output spindle, the adapter, and brake rotor. Any runout present in the system is directly measured by one or more measurement devices, which provide the operator with a suitable visual indication representative of the actual runout experienced by the on-car brake lathe as the adapter is rotated through one or more complete rotations. Using the visual indication, the operator manually adjusts one or more mechanical adjustment elements, such as screws or dials, altering the rotational axis of the on-car brake lathe output spindle to reduce the observed runout to within an acceptable tolerance for performing the resurfacing of the brake rotor.

To reduce the observed runout to within the desired tolerances using the manual runout compensation procedure usually requires several iterations when carried out by a skilled operator. The extra time spent by an operator to setup the on-car brake lathe and perform the manual runout compensation can substantially increase the time required to complete a brake rotor resurfacing, resulting in a corresponding increase in cost and lost productivity.

Accordingly, a number of on-car brake lathe devices have been configured with active automatic runout compensation mechanisms which do not require significant operator input. One such active automatic runout compensation mechanism is shown in U.S. Pat. No. 6,101,911 to Newell et al. The automatic runout compensation mechanism shown in the '911 Newell et al. patent includes at least one adjustment rotor interposed between a pair of adapters and which is concentric about an axial drive shaft. The on-car brake lathe motor and cutting elements are secured to one adapter, and the entire mechanism secured to the vehicle wheel hub via the second adapter. The adjustment rotor includes a slanted surface in engagement with either a second adjustment rotor having an opposing slanted surface or one of the adapters. An adjustment mechanism is utilized to alter the rotational orientation of the adjustment rotor about the axis of the axial drive shaft.

As the components of the '911 Newell et al. automatic runout compensation mechanism are rotated about the axis at a fixed speed, runout is detected by an accelerometer. A processor receives an output signal from the accelerometer and provides corresponding control signals to an adjustment mechanism. Alteration of the rotation position of the adjustment rotor about the axis of the axial drive shaft as the components are rotated attempts to compensate for the detected runout by altering the angle at which the two slanted surfaces are engaged, and correspondingly the angle between the first and second adapters. After each angle alteration, the runout is observed to determine if it has increased or decreased, leading to further adjustments. Due to significant high speed vibrations and the interaction of the various rotating components, such as bearings, gears, and shaft, errors are induced in the automatic runout compensation sensor signals. Thus, automatic runout compensation typically requires several complete rotations of the various components about the axis and adjustments before the adjustment rotor rotational position is sufficiently altered to compensate for any detected runout.

The automated adjustment mechanism of the '911 Newell et al. patent associated with the use of the one or more slant rotors is a costly and complex mechanical arrangement. The mechanism requires a lengthy trial-and-error adjustment process to compensate for any detected runout.

Accordingly, there is a need for on-car brake lathes having improved precision runout compensation mechanisms, which are not subjected to rotational movement noise and vibrations during runout measurements, and which can quickly and accurately compensate for detected runout by directly aligning a pair of slant rotors to a target orientation without a trial-and-error adjustment process.

It is further desirable to create a brake resurfacing system that will detect when a rotor resurfacing cut is completed and automatically stop the operation of the brake lathe, thereby reducing the time required for the operator to prepare the brake lathe to resurface the next rotor.

BRIEF SUMMARY OF THE INVENTION

In an embodiment of the present invention, an on-car brake lathe is provided with a precision runout compensation system. The precision runout compensation system monitors the rotational position of a pair of slant discs within an aligning joint of the on-car brake lathe. The system further monitors the amount of runout present between the rotating components of the on-car brake lathe wheel coupling and the wheel hub to which the on-car brake lathe is secured. Once the amount of runout is identified, the system calculates the appropriate rotational position for each slant disc within the aligning joint required to impart a necessary adjustment in the wheel coupling rotational axis in order to align with the rotational axis of the wheel hub. Finally, an adjustment mechanism is activated to rotationally drive each slant disc to the calculated rotational position with a minimum amount of rotational movement.

In a further embodiment of the present disclosure, the precision runout compensation system is configured to generate a representation of the time required to complete a runout compensation procedure once the amount of runout present between the rotating components of the on-car brake lathe wheel coupling and the wheel hub to which the on-car brake lathe is secured is determined. The representation of the time required is based on the current rotational positions of the slant discs, and the calculated appropriate rotational positions of the slant disc required to align the rotational axis of the aligning joint and wheel hub. By identifying the rotational change required for each slant disc, the precision runout compensation system can accurately determine the amount of time required to implement the required rotational changes. The determined amount of time may be displayed to an operator in any suitable form, such as by a count-down timer, sliding bar graph, or other graphical representation of time.

The foregoing features, and advantages set forth in the present disclosure as well as presently preferred embodiments will become more apparent from the reading of the following description in connection with the accompanying drawings.

BRIEF DESCRIPTION OF THE SEVERAL VIEWS OF THE DRAWINGS

In the accompanying drawings which form part of the specification:

FIG. 3 is an axially outboard (wheel hub side) perspective view of an aligning joint of the present disclosure;

FIG. 4 is an axially inboard (lathe side) perspective view of the aligning joint of FIG. 3;

Corresponding reference numerals indicate corresponding parts throughout the several figures of the drawings. It is to be understood that the drawings are for illustrating the concepts set forth in the present disclosure and are not to scale.

Figure 1:
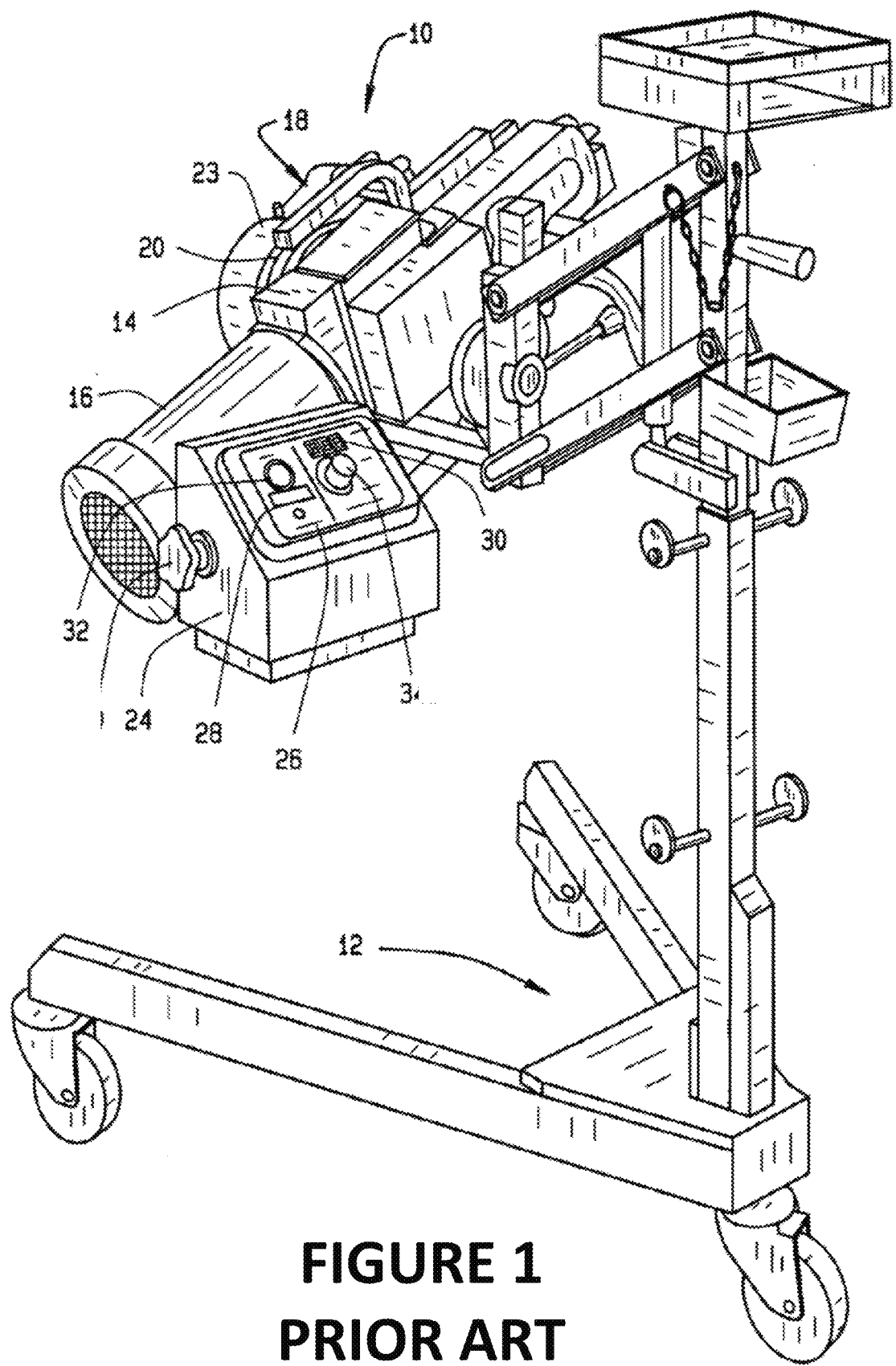
FIG. 1 is a perspective view of a prior art on-car vehicle brake lathe secured to a transport trolley.

Before any embodiments of the invention are explained in detail, it is to be understood that the invention is not limited in its application to the details of construction and the arrangement of components set forth in the following description or illustrated in the drawings.

DETAILED DESCRIPTION

The following detailed description sets forth the invention by way of example and not by way of limitation. The description enables one skilled in the art to make and use the present disclosure, and describes several embodiments, adaptations, variations, alternatives, and uses of the present disclosure, including what is presently believed to be the best mode of carrying out the invention.

Figure 2:
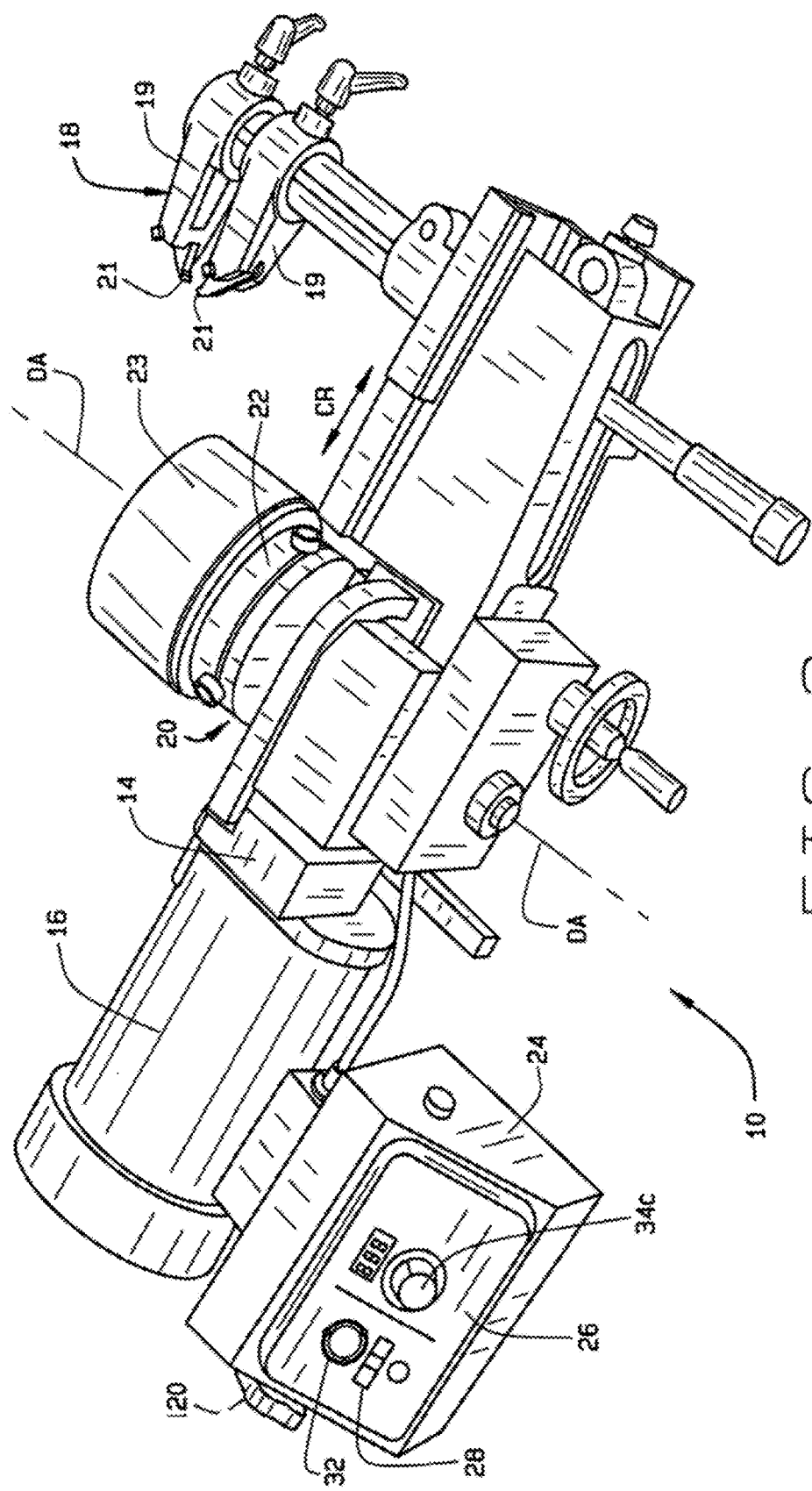
FIG. 2 is a top perspective view of the prior art on-car vehicle brake lathe of FIG. 1.

Referring to FIGS. 1 and 2, a basic on-car brake lathe 10 is shown mounted to a transport trolley 12 for positioning adjacent a vehicle to be serviced (not shown). The on-car brake lathe 10 includes a support structure 14, onto which is mounted a spindle motor 16, which may be a variable speed motor, an adjustable cutting head 18, and an output spindle 20. The spindle motor 16 is coupled to the output spindle 20 through a conventional drive mechanism (not shown) contained within the support structure 14, to rotate the output spindle 20 about a drive axis DA, and to linearly feed the cutting head 18 having spaced apart tool holders 19 and cutting bits 21 through a predetermined cutting range CR. An aligning joint 22 is secured to the output spindle 20, concentric with the drive axis DA, and includes a removable adapter 23 selected to couple the output spindle 20 to a vehicle wheel hub or brake assembly (not shown). An operator console or electrical enclosure 24 may be provided to support an operator interface 26 and lathe control components such as logic circuits or processing systems (not shown). The operator interface 26 may include a variety of interface elements, such as displays 28, 30 and visual display elements 32 configured to provide the operator with information associated with the operation of the on-car brake lathe 10. Operator input controls 34 may be incorporated into the operator interface 26, and may include elements such as, but not limited to, a start button, a stop button, a spindle speed control knob, a compensation button, and a runout test button. Alternative suitable means for providing necessary operator input, such as through a configurable touch-screen or remote interface (not shown) may be utilized without departing from the scope of the present disclosure.

Figure 5:
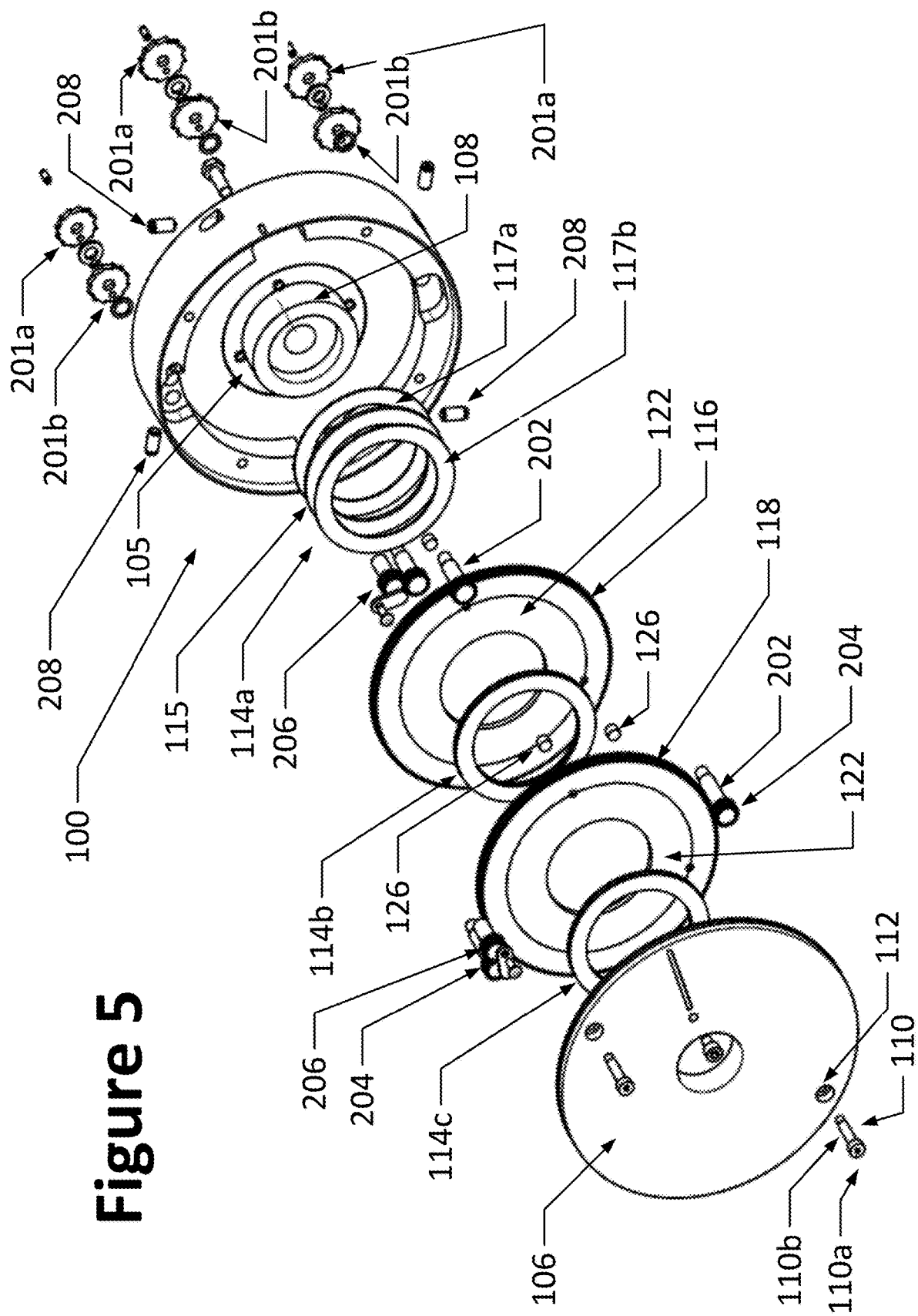
FIG. 5 is an exploded perspective view of the aligning joint of FIG. 3.

Turning to FIGS. 3-5, an aligning joint 22 of the present disclosure is shown in multiple views. The aligning joint 22 has a cylindrical body 100 with an axially outboard end 102 (FIG. 3) which abuts against the adapter 23, and an axially inboard end 104 (FIG. 4) which faces the structure 14 of the on-car brake lathe 10 and abuts against an outboard face of the rotationally driven output spindle 20. To ensure rotational clocking between the aligning joint 22 and the output spindle 20, a drive lug 104a in the axially inboard end 104 engages a matching bore (not shown) in the output spindle face. The rotational position of the output spindle is known at all times via an associated spindle encoder (not shown), and hence, the rotational position of the aligning joint 22 itself is known at all times.

Within the aligning joint 22, an axial bore 105 receives a shaft (not shown) along the drive axis DA for clamping the aligning joint 22 against the output spindle 20 and securing the adapter 23 against the face of the axially outboard end 102. The axially outboard end 102 consists of a plate 106 configured to rotate with axially inboard end 104 while floating axially along the drive axis DA. The axially inboard end 104 is rigidly coupled to the cylindrical body 100 and includes a raised boss 108 projecting axially outward about the drive axis DA and bore 105, towards the axially outboard end 102. The raised boss 108 receives a plurality of shoulder bolts 110 in threaded and abutting engagement, each of which passes through outward facing oversize counter-bores 112 in the plate 106. A head portion 110a of each shoulder bolt 110 seats within the associated oversize counter-bore 112 to capture the plate 106 by engagement of the threaded portion 110b of the shoulder bolts with the raised boss 108, defining a limited range of axial and tilting movement for the plate 106 along the drive axis DA relative to the axially inboard end 104 while maintaining the plate 106 in rotational alignment with the inboard axial end 104 of the aligning joint 22.

Figure 6:
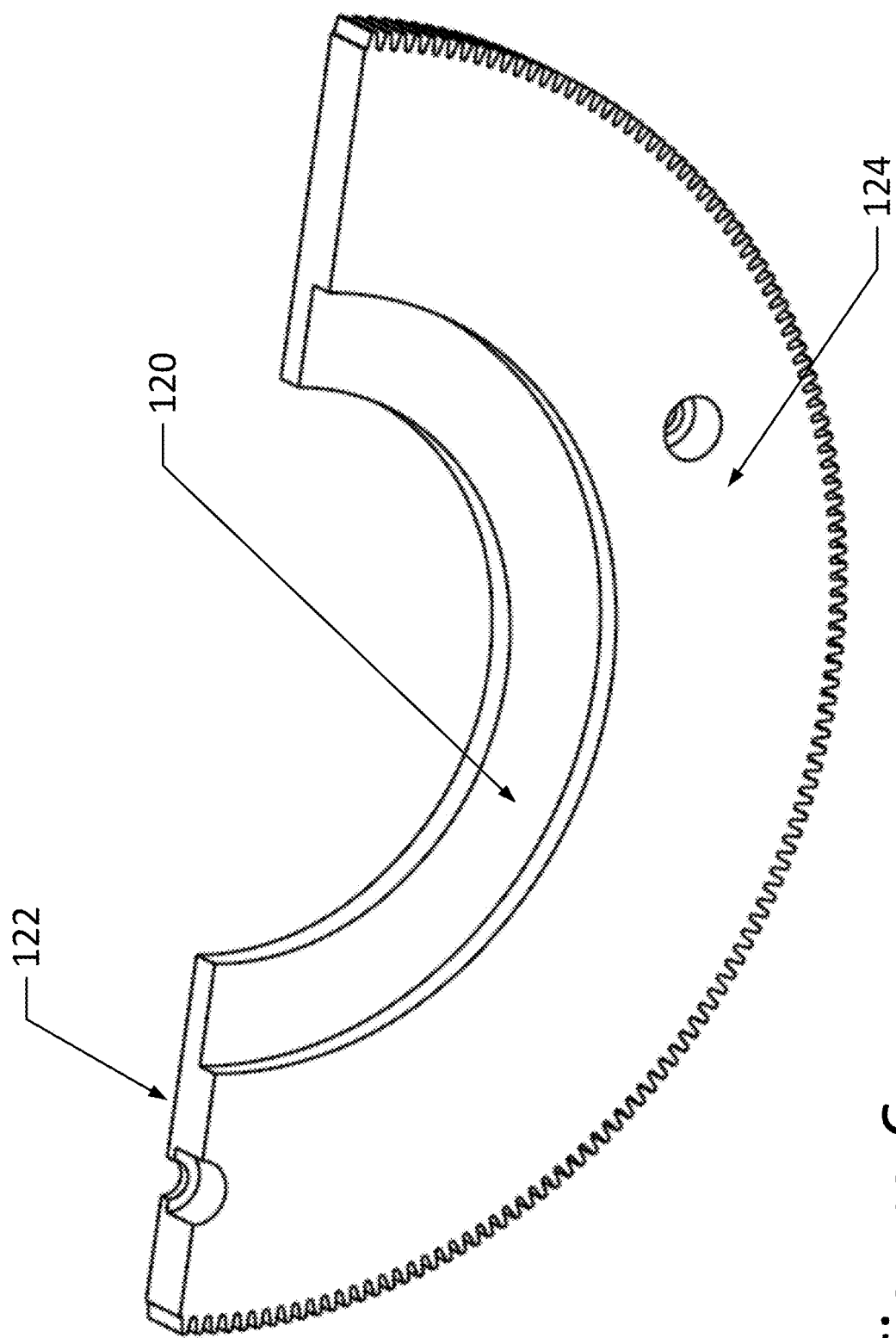
FIG. 6 is a cross-sectional perspective view of one slant disc in the aligning joint of FIG. 5.

The internal components of the aligning joint 22 for controlling the angular orientation of the plate 106 relative to the axially inboard end 104 of the aligning joint 22 are best seen in FIGS. 5 and 6. The internal components consist of three annular bearings 114a-c for rotation about the drive axis DA with a first slant disc 116 interposed between the first and second annular bearings 114a, 114b, and a second slant disc 118 interposed between the second and third annular bearings 114b, 114c. As shown in FIG. 6, each slant disc is configured with a recessed annular slant surface 120 oriented at an oblique angle relative to a surrounding outer annular surface 122 and to the opposite axial face 124 of the disc. The oblique angle is selected such that one point on the slant surface 120 defines a maximum depth, while a point diametrically opposite about the drive axis DA defines a minimum depth. The outer circumferential surface of each slant disc 116, 118 is toothed to engage a set of adjustment gears as described below.

Each annular bearing 114 consists of a set of rolling elements 115 captured between a pair of annular races 117a, 117b for rotational movement about an axis. The first annular bearing 114a is disposed with a first annular race 117a seated against a planar surface of the axially inboard end 104, surrounding the raised boss 108 and aligned perpendicular to the drive axis DA. The second annular race 117b of the bearing 114a is seated against the recessed annular slant surface 120 of the first slant disc 116, such that the first slant disc 116 is aligned relative to the axially inboard end 104 at an angle which corresponds to the oblique angle of the recessed annular slant surface 120. The second annular bearing 114b is disposed with a first annular race 117a seated against the axial face 124 of the first slant disc 116. The second annular race 117b of the bearing 114b is seated against the recessed annular slant surface 120 of the second slant disc 118, such that the second slant disc 118 is aligned relative to the axial face 124 of the first slant disc 116 at an angle which corresponds to the oblique angle of the recessed annular slant surface 120. The third annular bearing 114c is disposed with a first annular race 117a seated against the axial face 124 of the second slant disc 118, and with the second annular race 117b seated against a planar surface on the inboard side of plate 106.

It will be readily recognized that the orientation of the plate 106 relative to the planar surface of the axially inboard end 104 is determined by the rotational orientations of the slant discs 116 and 118, and more specifically, by the relative rotational orientation of the recessed annular slant surfaces 120 on each slant disc and the associated rotational phase position of the slant discs within the aligning joint 22. Effectively, this introduces a known amount of runout into the overall runout between the on-car lathe and the wheel hub to which it is secured. The remaining portion of runout is due to any misalignment in the mounting itself.

If the recessed annular slant surfaces 120 are rotationally aligned in-phase with each other such that the high point on each surface is in rotational alignment, the plate 106 will be oriented relative to the axially inboard end 104 at a maximum angle which is equal (within acceptable machining and stack-up tolerances) to twice the oblique angle of the recessed annular slant surfaces 120. If the recessed annular slant surfaces 120 are rotationally aligned such that the high point on each surface is 180 degrees out of phase, the oblique angles of the recessed annular slant surfaces 120 will offset each other, and plate 106 will be oriented parallel to the axially inboard end 104 of the aligning joint 22. By rotationally positioning one slant disc 116 relative to the other slant disc 118, the orientation of the plate 106 can be controlled to achieve incremental angular orientations between these two extremes relative to the axially inboard end 104 of the aligning joint 22, thereby altering a magnitude of the known runout component. By rotationally positioning both slant discs 116 and 118 in sync (i.e., relative to the axis of the aligning joint 22 itself) about the drive axis DA, the phase position of the known runout component can be altered.

Figure 9:
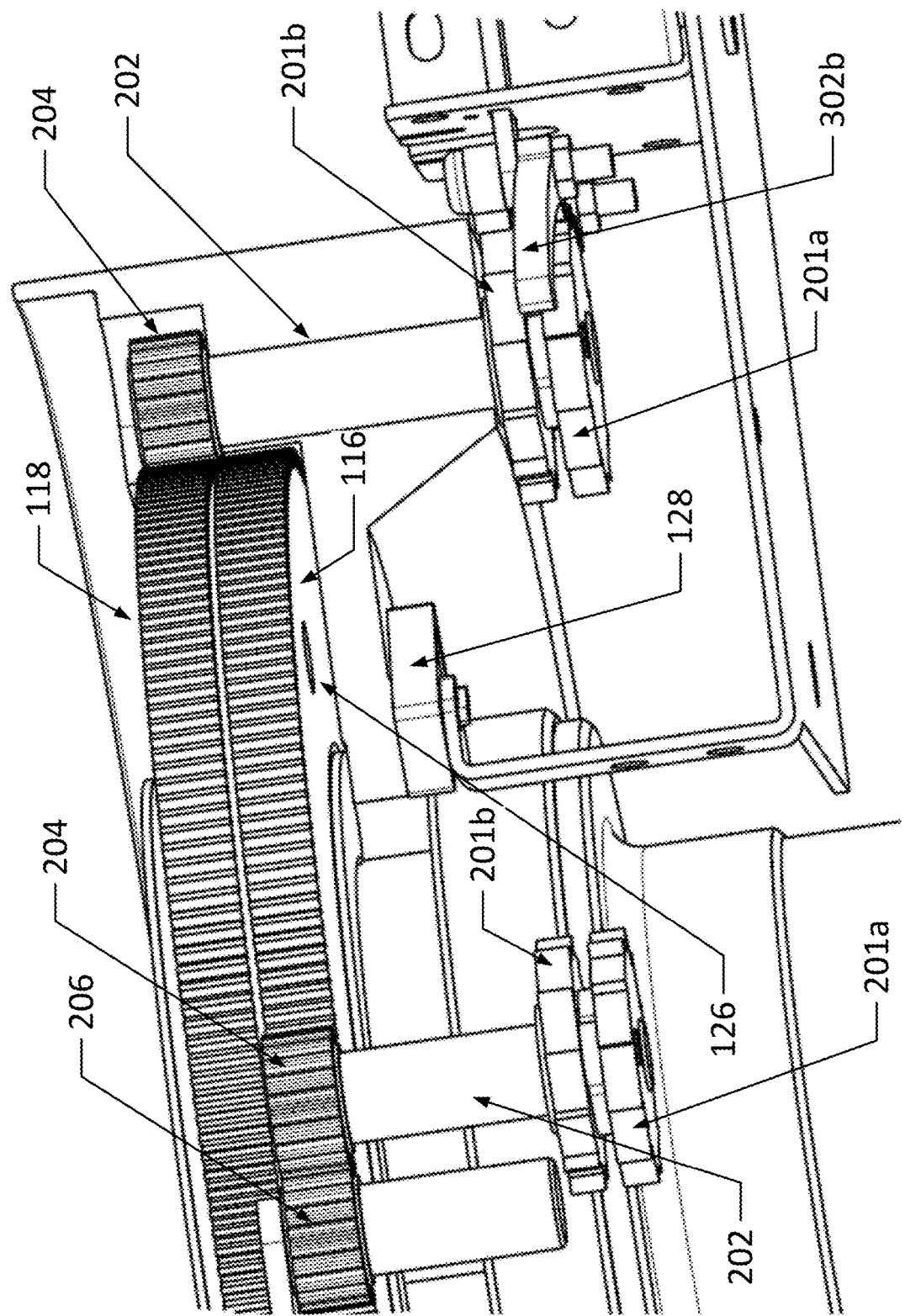
FIG. 9 is a perspective view of the axially inboard side of the aligning joint of FIG. 3 with the housing removed, illustrating the position of a Hall Effect sensor assembly for monitoring the rotational position of the slant discs.
Figure 10:
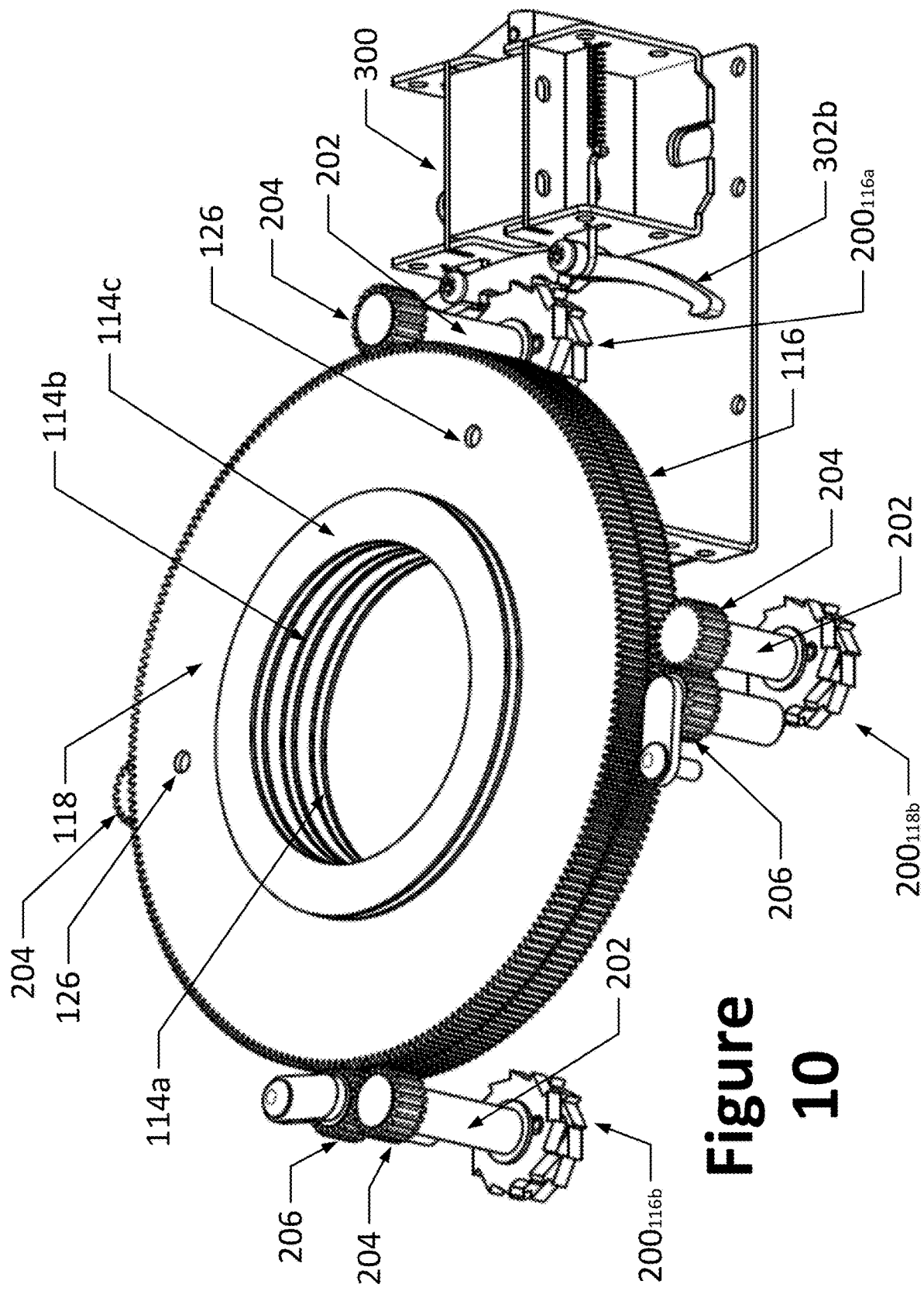
FIG. 10 is perspective view illustrating the arrangement of slant discs and engaging star wheels within the aligning joint of FIG. 8.

Rotational alignment of the slant discs 116 and 118 is facilitated by a position monitoring system and an adjustment system, both of which operate in conjunction with a logic circuit such as a microprocessor or controller (not shown). As seen in FIGS. 5, 9, and 10, the position monitoring system consists of magnetic nodes 126 placed in the axial face 124 of each slant disc 116, 118, together with a sensor receptive to magnetic fields, such as a Hall Effect sensor 128, disposed in axially spaced proximity to the slant discs, at the same radial displacement as the magnetic nodes. To reduce magnetic interference, it is preferable that the use of ferrous materials within the aligning joint 22 be kept to a minimum. For example, slant discs 116, 118 may be formed from a non-ferrous material, such as bronze, and the cylindrical housing be formed from aluminum.

In one embodiment, slant disc 116 is provided with a single magnetic node 126 which is in circumferential alignment with known point on the associated recessed annular slant surface 120. For example, the magnetic node 126 may be disposed in alignment with a point of maximum depth, a point of minimum depth, or disposed at a known angular offset from either such point. Slant disc 118 is provided with two magnetic nodes 126, one of which is in circumferential alignment with a known point on the associated recessed annular slant surface 120, and the other of which is angularly offset therefrom by a known amount. Each magnetic node 126 is positioned at common radial distance from the drive axis DA, such that the Hall Effect sensor 128, disposed in a fixed position external to the cylindrical housing 100, adjacent the axially inboard surface, and at the same common radial distance from the drive axis DA (as seen in FIGS. 9 and 10), can detect the passage of the magnetic nodes 126 as the slant discs 116, 118 rotate about the drive axis DA.

Given that the magnetic node 126 in the slant disc 116 is axially closer to the Hall Effect sensor 128 than the magnetic nodes 126 in slant disc 118, it will be appreciated that a stronger signal is acquired at sensor 128 when that node is in rotational proximity to the sensor. Effectively, rotation of the slant disc 116 about the drive axis DA will produce an output signal at sensor 128 having a single large pulse each time the magnetic node 126 rotates past the sensor. Correspondingly, rotation of slant disc 118 about the drive axis DA will produce an output signal at sensor 128 having two smaller pulses (due to the greater axial distance between the sensor and the slant disc) which are spaced apart by a known angular rotation. By providing two magnetic nodes 126 in slant disc 118, it becomes possible to identify the rotational orientation of the slant disc 118 even when one of the magnetic nodes 126 therein is in rotational alignment with the magnetic node 126 in slant disc 116, as one of the two smaller pulses will always be detected by the Hall Effect sensor 128 during a complete rotation of the aligning joint 22.

Relative rotational positions of the slant discs 116, 118 to each other, as well as absolute rotational positions of the slant discs 116, 118 about the drive axis DA, are altered via the adjustment system illustrated in FIGS. 4, 5, and 7-10 which is active during driven rotation of the output spindle 20 and aligning joint 22. The adjustment system consists generally of two pairs 200 of star wheels or ratchet gears 201 for each slant disc, one pair for altering the rotational position of the associated slant disc in a first direction, and another pair for altering the rotational position of the associated slant disc in an opposite direction. Each pair 200 of star wheels or ratchet gears 201 consists of a clockwise star wheel or ratchet gear 201a and a counterclockwise star wheel or ratchet gear 201b. In one embodiment, such as seen in FIGS. 9 and 10, containing two slant discs 116, 118, a total of four equidistantly spaced pairs 200 are provided (designated as $200_{116a}$, $200_{116b}$, $200_{118a}$, and $200_{118b}$), with the two pairs 200 associated with each slant disc positioned at diametrically opposite points about the drive axis DA, axially inboard from (i.e. external to) the axially inboard end 104 of the housing 100. Alternate configurations or placements are possible without altering the functionality of the device. Each pair 200 of star wheels or ratchet gears 201 is radially spaced from the drive axis DA, and coupled to an associated stub shaft 202 which passes through the axially inboard end 104, and terminates at an engaging gear 204 in proximity to the circumferential edge of one of the slant discs 116, 118. A bias element 208, such as a spring-loaded ball bearing, is optionally provided to impart a limited frictional force against the stub shaft 202 to prevent unwanted rotation.

As best seen in FIG. 10, each slant disc 116, 118 is associated with two pairs 200 of ratchet gears 201a and 201b. Pairs $200_{116a}$ and $200_{116b}$ for slant disc 116 are positioned 90 degrees offset about the drive axis DA from the pairs $200_{118a}$ and $200_{118b}$ for slant disc 118. The engaging gear 204 associated with each pair $200_{116a}$ and $200_{118a}$ of ratchet gears is disposed to directly engage the geared circumferential edge of the associated slant disc 116, 118, while the engaging gear 204 associated with each other pair $200_{116b}$ and $200_{118b}$ of ratchet gears is disposed to engage an associated idler gear 206, which in turn is disposed to engage the geared circumferential edge of the associated slant disc 116, 118. Those of ordinary skill in the art will appreciate that rotation of the engaging gears 204 directly with the slant discs 116, 118 will rotate the associated slant discs in a first direction about the drive axis DA, while rotation of the engaging gears 204 with the idler gears 206 will rotate the associated slant discs in a second and opposite direction about the drive axis DA.

As the aligning joint 22 rotates during operation of the lathe 10, each pair 200 of ratchet gears is rotationally carried about the drive axis DA by the housing 100, as are the slant discs 116 and 118. Absent any external influence, the slant discs 116, 118 and each pair 200 of the ratchet gears remain stationary relative to each other during the rotation of the aligning joint 22. Selectively rotating one of the ratchet gears 201a or 201b in one of the pairs 200 associated with a slant disk will rotate the relative position of the slant disk about the drive axis DA in a first direction if the pair 200 is engaged with the slant disc through an engaging gear 204, or in the opposite direction if the pair 200 is engaged with the slant disc through an idler gear 206. It will be recognized that the change in rotational position of the slant disc is directly proportional to the amount of rotation of the respective ratchet gear 201a or 201b and the gearing between the engaging gear 204 and slant disc. Accordingly, by controlling rotation of the ratchet gears 201a and 201b in a pair associated with each slant disc 116, 118, the relative rotational position of the slant discs about the drive axis DA can be altered individually to achieve a target orientation of the aligning joint 22 via the relative angles of the slant surfaces 120.

Figure 7:
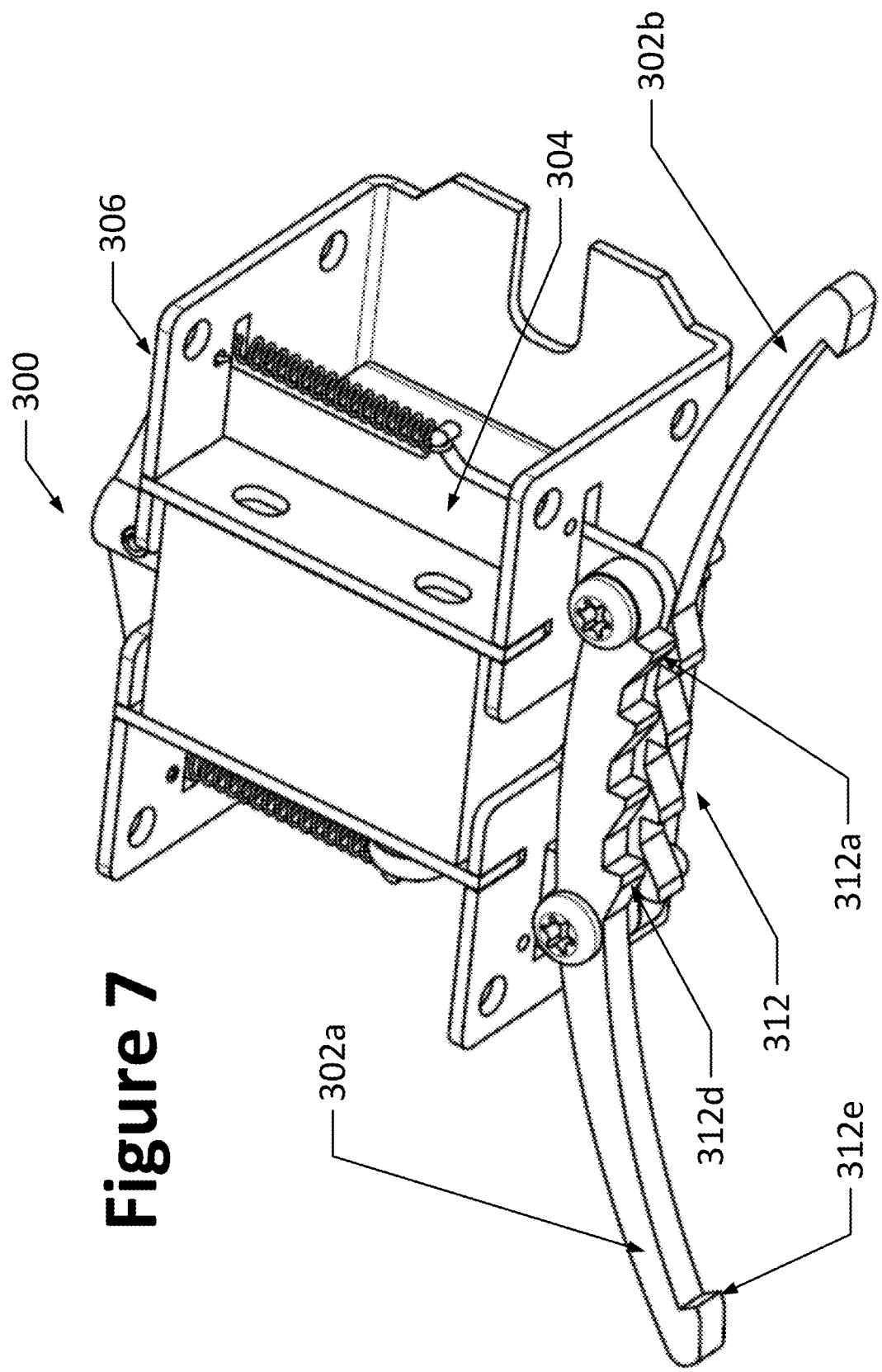
FIG. 7 is a ratcheting pawl assembly for use with the aligning joint of FIG. 3.

To control rotation of the ratchet gears 201a and 201b in each pair, an actuation mechanism 300 shown in FIG. 7 is provided, consisting of a clockwise pawl 302a and a counterclockwise pawl 302b coupled to a spring-biased framework 304. The framework 304 is secured in a fixed location relative to the housing 100 and aligning joint 22. Pawl 302a is configured to engage, and axially aligned with the ratchet gears 201a in each pair 200, while pawl 302b is configured to engage, and axially aligned with the ratchet gears 201b in each pair 200. The actuation mechanism 300 is supported within a bracket 306 secured in proximity to the outer circumference of the housing 100, as seen in FIG. 10, such that the pawls 302a and 302b do not engage the ratchets of the ratchet gears 201a and 201b while in a retracted state. A linear actuator 310 supported within the bracket 306 is positioned to push the pawls 302a and 302b simultaneously, displacing them in a radially inward direction towards the ratchet gear pairs 200, in response to an actuation signal or applied voltage. Upon removal of the actuation signal or applied voltage, the spring-biased framework 304 retracts the pawls 302a and 302b back to the retracted state in a radially outward direction.

Figure 8:
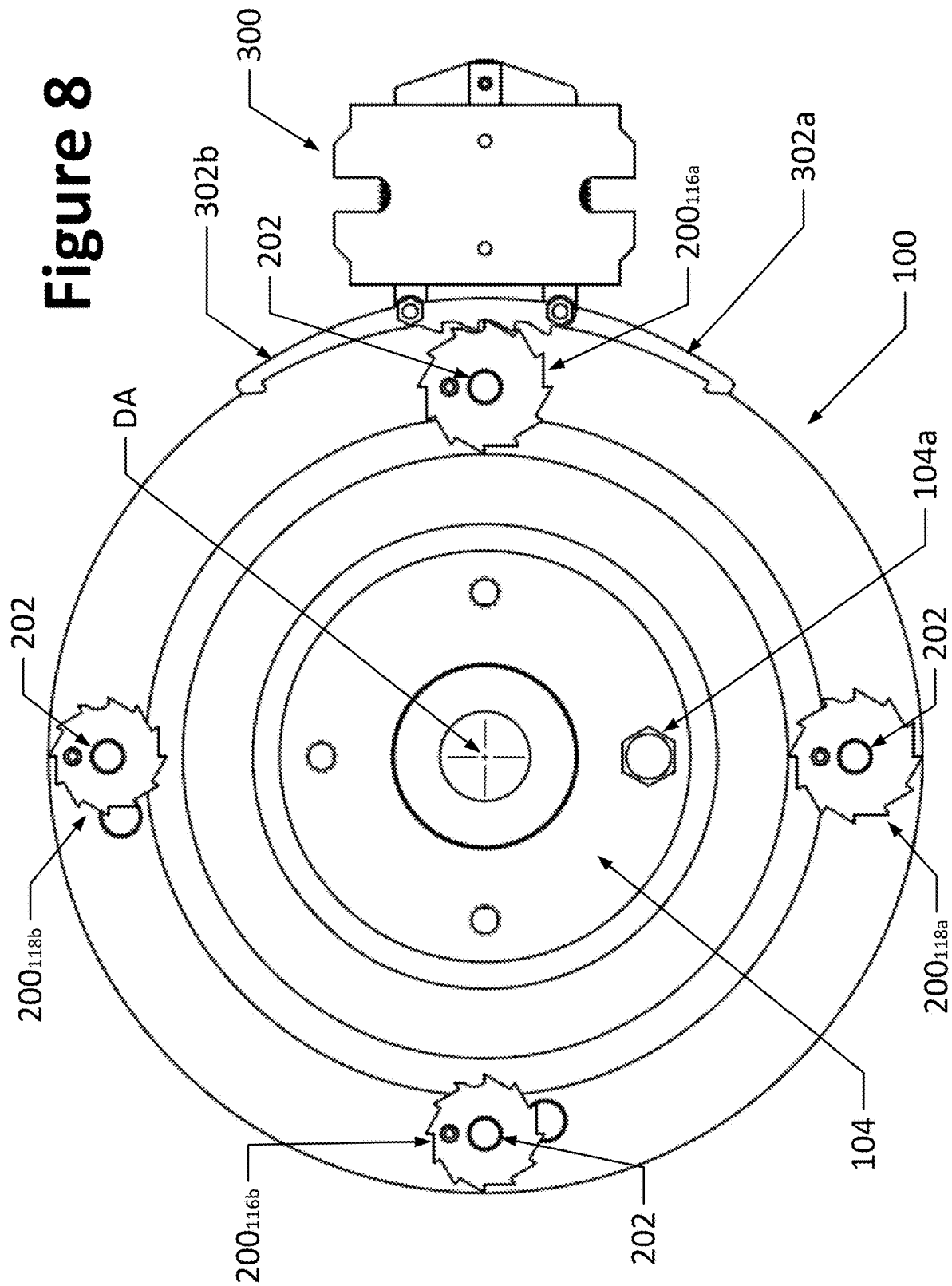
FIG. 8 is an inboard axial end view of the aligning joint of FIG. 4, illustrating placement and engagement of the ratcheting pawl assembly of FIG. 7.

As best seen in FIG. 8, each clockwise pawl 302a and counterclockwise pawl 302b incorporates a set of ratchet teeth 312 configured to engage the ratchets on a corresponding clockwise ratchet gear 201a or counterclockwise ratchet gear 201b when the aligning joint 22 is rotating in the associated clockwise or counter-clockwise direction. In one embodiment, the ratchet teeth 312 are arranged in a coarse adjustment cluster of four teeth 312a-312d, together with a spaced apart fine adjustment single tooth 312e. By selectively controlling when the linear actuator 310 is activated, each pawl 302a, 302b may be engaged with a corresponding ratchet gear 201a or 201b for either four "ticks", five "ticks" or a single "tick", wherein a "tick" represents the engagement between a single tooth 312 and a single ratchet on a gear 201a or 201b during rotation of the aligning joint 22 past the actuation mechanism 300. Each "tick" results in the rotation of the ratchet gear pair 200 by a fixed amount in a known direction about the drive axis DA, and correspondingly, through the interaction of the intervening gear assemblies, a rotation of an associated slant disc 116 or 118 by a known amount, such as 2.7 degrees, about the drive axis DA. Those of ordinary skill in the art will recognize that the number of ratchet teeth 312, and the arrangement thereof on each pawl 302a, 302b may be varied to achieve a number of desired arrangements for both coarse and fine adjustment of slant disc rotational positions. The orientation of each tooth 312 on the pawls 302 is selected such that only one pawl will engage with a ratchet gear 201 in a pair 200 of ratchet gears for a given rotational direction of the housing 100 and aligning joint 22.

The following table sets forth an exemplary description of the slant disc rotational position changes which occur following activation of the linear actuator to displace the pawls into engagement with the ratchet gears during both clockwise and counter-clockwise rotation of the aligning joint about the drive axis:

| | | | | |
|---|---|---|---|---|
| Clockwise Rotation - Pawl 302A | Can engage ratchet gear 201a of pair $200_{116a}$ to rotate slant disc 116 clockwise. | Can engage ratchet gear 201a of pair $200_{116b}$ to rotate slant disc 116 counter-clockwise. | Can engage ratchet gear 201a of pair $200_{118a}$ to rotate slant disc 118 clockwise. | Can engage ratchet gear 201a of pair $200_{118b}$ to rotate slant disc 118 counter-clockwise. |
| Clockwise Rotation - Pawl 302B | Does not engage. | Does not engage. | Does not engage. | Does not engage. |
| Counter-Clockwise Rotation - Pawl 302A | Does not engage. | Does not engage. | Does not engage. | Does not engage. |
| Counter-Clockwise Rotation - Pawl 302B | Can engage ratchet gear 201b of pair $200_{116a}$ to rotate slant disc 116 counter-clockwise. | Can engage ratchet gear 201b of pair $200_{116b}$ to rotate slant disc 116 clockwise. | Can engage ratchet gear 201b of pair $200_{118a}$ to rotate slant disc 118 counter-clockwise. | Can engage ratchet gear 201b of pair $200_{118b}$ to rotate slant disc 118 clockwise. |

Displacement of the pawls 302a and 302b by the linear actuator, and retraction of the pawls 302a and 302b by the spring-biased framework occurs with sufficient speed and precision so as to enable the pawls to be selectively displaced to bring either the coarse adjustment set of teeth 312a-d or the fine adjustment single tooth 312e into engagement with a ratchet gear 201 during rotation of the aligning joint 22. The rotation of the aligning joint 22 is at a desired speed about the drive axis DA which rotates the housing, and correspondingly, the pairs 200 of ratchet gears, past the fixed position of the actuation mechanism 300.

Figure 11:
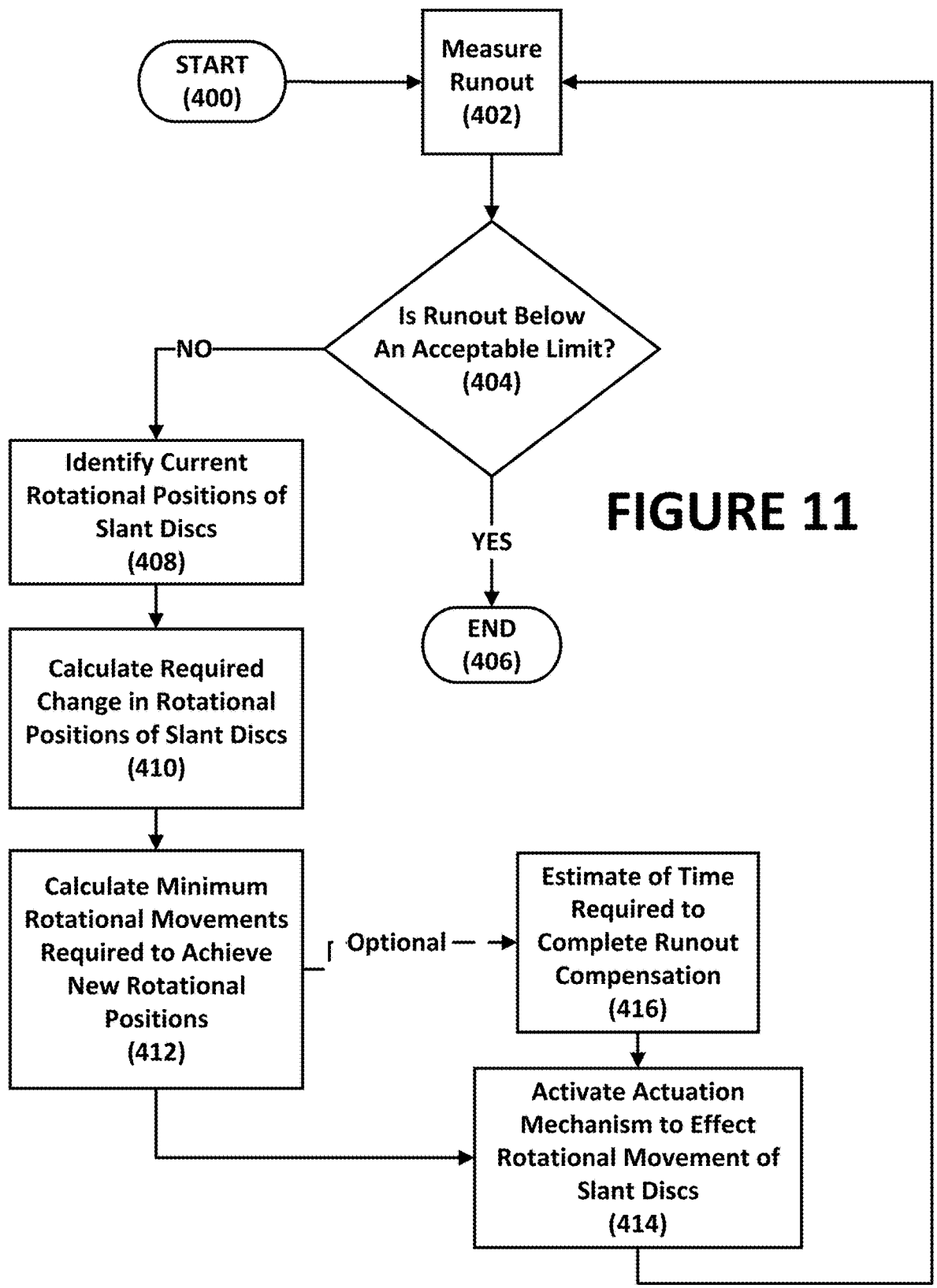
FIG. 11 is a flow chart setting forth a procedure of the present disclosure for runout compensation.

Turning to FIG. 11, a method of the present disclosure is illustrated for automatically compensating for runout present between the drive axis DA of the on-car lathe and the rotational axis of a vehicle wheel hub assembly to which the on-car lathe is secured for a brake rotor resurfacing procedure. Initially, (Box 400) the procedure begins by engaging the lathe spindle motor 16 to rotationally drive the output spindle 20, including the keyed aligning joint 22 about the drive axis DA, concurrently turning the vehicle wheel hub assembly coupled thereto. As the output spindle 20 rotates about the drive axis DA, rotational position data and a measure of runout (i.e., misalignment) between the drive axis DA and the rotational axis of the vehicle wheel hub is measured (Box 402) in a conventional manner and provided to the lathe logic circuits, such as a microprocessor or controller (not shown) configured with suitable software instructions for operating the lathe components. The lathe logic circuits compare a magnitude (level) of the measured runout with a predetermined or selected runout threshold (Box 404) to determine if the measure of runout is acceptable. If the measurement is representative of an acceptable level of runout, the compensation process is complete, and brake rotor resurfacing can begin (Box 406).

In the event that the measurement is representative of an unacceptable level of runout, the logic circuit proceeds to calculate a change in a rotational position about the drive axis DA for one or more of the slant discs 116, 118 contained within the aligning joint 22 which would either minimize the magnitude of the runout or reduce the magnitude of the runout to an acceptable level. In order to calculate the required changes in the relative and absolute rotational positions for the slant discs 116, 118, the logic circuit first identifies the current rotational position of one slant disc relative to the other (Box 408) using the output signals obtained by the Hall Effect sensor 128. Given the known relationship between the magnetic nodes in each slant disc, and the angular orientation of each slant disc, the logic circuit establishes a current angular orientation of the aligning joint 22. Utilizing the measured runout, and the current angular orientation of the aligning joint, the logic circuit can identify a required change in angular orientation of the slant discs (Box 410) necessary to achieve the minimum or acceptable runout. Often, there will be multiple rotational positions of the slant discs 116, 118 which will achieve a satisfactory result. Preferably, the logic circuit identifies the required change which will achieve the desired result in the least amount of time. Further calculations by the logic circuit utilizing the required change in angular orientation, current rotational position of each slant disc, and the known oblique angles of the slant surfaces 120 on the slant discs, identify a minimum rotational position change (Box 412) for at least one of the slant discs 116, 118 which will achieve the required change in angular orientation.

Figure 12:
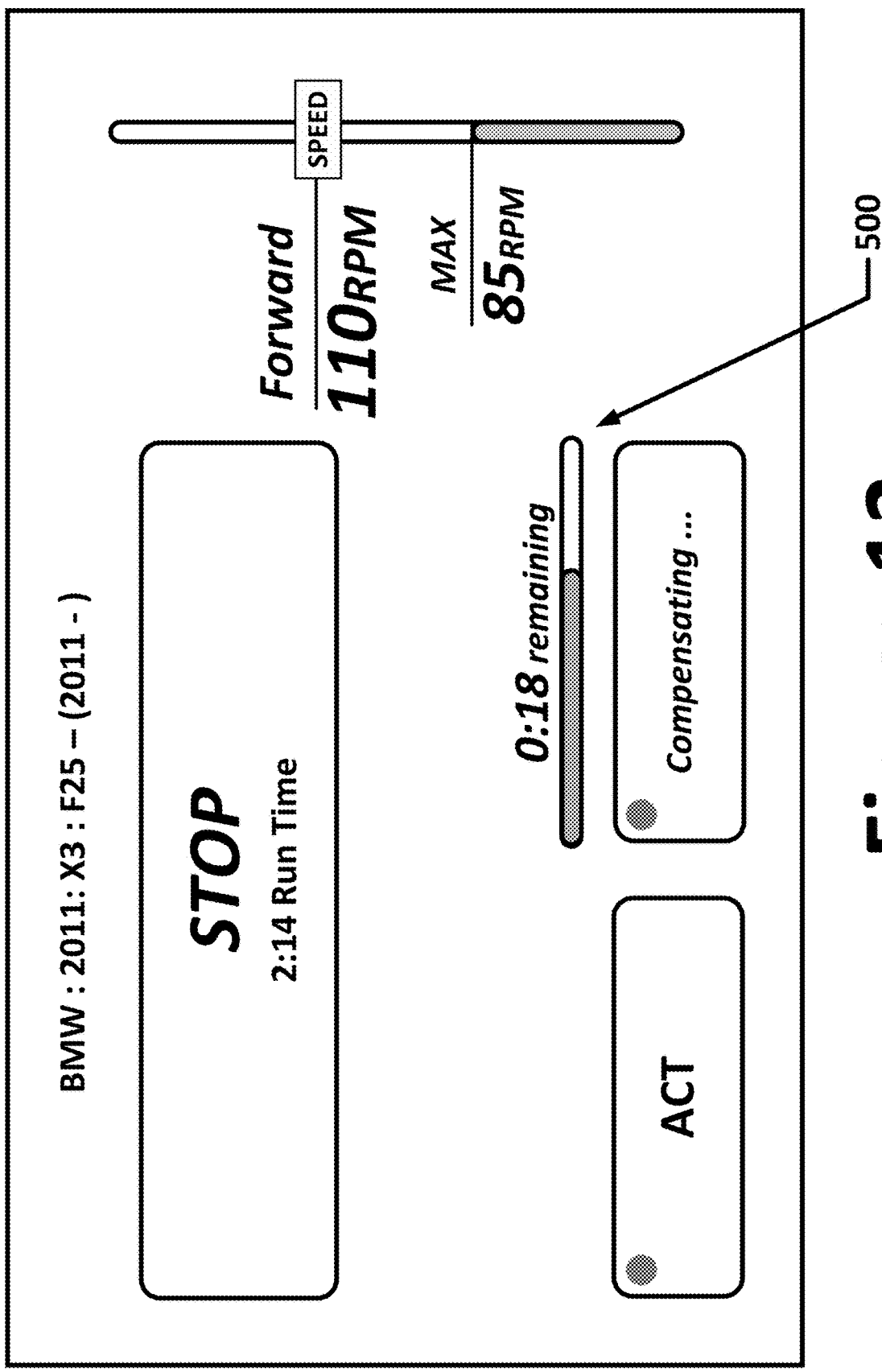
FIG. 12 is an exemplary brake lathe display screen providing a visual and alpha-numeric representation of remaining runout compensation time.

Once the rotational position change for at least one of the slant discs 116, 118 is identified, the logic circuit selectively activates (Box 414) the actuation mechanism 300 to engage the coarse set of teeth 312a-d and the fine adjustment single tooth 312e on one of the pawls 302 with the ratchet gears 201 associated with the selected slant disc. A specific sequence of activations is dependent upon the current direction of rotation for the aligning joint, the identified rotational position change required for the slant discs, and the amount of rotational position change achieved by engagement of the coarse adjustment set of teeth 312a-d and the fine adjustment single tooth 312e. It will be recognized that during one full rotation of the aligning joint 22 about the drive axis DA, the set of coarse adjustment teeth 312a-d and the fine adjustment single tooth 312e on a pawl may only be engaged once with the corresponding ratchet gears 201 associated with a single slant disc, thereby establishing a maximum amount of rotational position change in a slant disc 116, 118 which may be achieved during a single rotation of the aligning joint 22. Optionally, if the rotational speed of the aligning joint 22 is known, and the number of required engagements of the coarse and fine adjustment teeth 312 is known, the logic circuit can provide an estimate of the time required to complete the runout compensation (Box 416) prior to, or during, activation of the actuation mechanism. As shown in FIG. 12, this estimated time can be displayed to the operator in the form of a timer countdown 500 or suitable graphical presentation such as a shortening bar, or fading circle, etc.

Once the required activation sequence for the pawls 302 is completed, the misalignment (i.e., runout) between the drive axis DA and the rotational axis of the vehicle wheel hub is again measured (Box 402) in a conventional manner and provided to the lathe logic circuits. The lathe logic circuits again compare the measured runout with the predetermined or selected runout threshold (Box 404) to determine if the new measure of runout is acceptable. If the new measurement is representative of an acceptable level of runout, the compensation process is complete, and brake rotor resurfacing can begin (Box 406). If the new measure of runout is indicative of an unacceptable level of remaining runout, the process of calculating rotational positons (Box 408) and altering the rotational position of the slant plates (Box 410) is repeated at least once.

While the present disclosure sets forth the use of magnetic nodes and Hall Effect sensors to monitor the rotational position of the slant discs, those of ordinary skill in the art will recognize that a variety of other position-monitoring techniques may be utilized without departing from the inventive aspects of the invention, provided that the current rotational position of the slant discs relative to each other is determinable. For example, optical sensors such as photo-interrupters may be utilized with appropriate additions to the slant discs to either block or unblock light beams during rotation about the drive axis. Similarly, mechanical position monitoring systems such as gears or shafts linked to the slant discs and angular sensors may be utilized.

It will be further recognized that the inventive aspects of the present invention are not limited to use with aligning joints having only two slant discs. A single slant disc (and corresponding pairs 200 of ratchet gears 201) may be employed if a fixed slant surface is provided within the cylindrical housing 100, providing correction for the magnitude of the runout only, but not the rotational phase. Alternatively, three or more slant discs (and corresponding pairs 200 of ratchet gears 201) may be employed. Increasing the number of slant discs may provide for extremely fine adjustments to the drive axis DA orientation through the aligning joint 22, or a greater range of runout magnitude correction.

The present disclosure can be embodied in-part in the form of computer-implemented processes and apparatuses for practicing those processes. The present disclosure can also be embodied in-part in the form of computer program code containing instructions embodied in tangible media, or another computer readable non-transitory storage medium, wherein, when the computer program code is loaded into, and executed by, an electronic device such as a computer, micro-processor or logic circuit, the device becomes an apparatus for practicing the present disclosure.

The present disclosure can also be embodied in-part in the form of computer program code, for example, whether stored in a non-transitory storage medium, loaded into and/or executed by a computer, or transmitted over some transmission medium, wherein, when the computer program code is loaded into and executed by a computer, the computer becomes an apparatus for practicing the present disclosure. When implemented in a general-purpose microprocessor, the computer program code segments configure the microprocessor to create specific logic circuits.

As various changes could be made in the above constructions without departing from the scope of the disclosure, it is intended that all matter contained in the above description or shown in the accompanying drawings shall be interpreted as illustrative and not in a limiting sense.

The invention claimed is:

1. An on-car brake lathe system for resurfacing a brake rotor of a vehicle brake assembly, the brake lathe system having an output spindle, said output spindle adapted for coupling to a vehicle wheel hub and rotationally driven about a drive axis, comprising:

an aligning joint associated with the output spindle, said aligning joint including a plurality of slant surfaces inclined at an angle relative to an axis of said aligning joint, at least one of said slant surfaces being rotationally adjustable relative to the other, whereby an orientation of said output spindle relative to the vehicle wheel hub is determined by relative rotational positions of each of said slant surfaces;

a means for determining a current rotational position of each of said plurality of slant surfaces within said aligning joint;

an actuation mechanism for selectively altering said relative rotational positions of said slant surfaces; and a control system configured to determine a relative rotation between said plurality of slant surfaces from said current rotational positions to selectively activate said actuation mechanism to adjust said output spindle relative orientation.

2. The on-car brake lathe system of claim 1 wherein said means for determining said relative rotational position of said slant surfaces includes a stationary Hall Effect sensor disposed to detect a rotational passage of at least one magnetic node associated with each rotationally adjustable slant surface.

3. The on-car brake lathe system of claim 2 wherein each magnetic node is associated with a predetermined position on a rotationally adjustable slant surface.

4. The on-car brake lathe system of claim 1 wherein said actuation mechanism is configured to selectively alter said relative rotational positions of said slant surfaces via bi-directional rotation of at least one of said slant surfaces about said axis of said aligning joint.

5. The on-car brake lathe system of claim 4 wherein said actuation mechanism is configured to selectively alter said relative rotational positions of said slant surfaces during clockwise and counter-clockwise rotation of said aligning joint.

6. The on-car brake lathe system of claim 1 further including a runout measurement system configured to measure axial runout between said output spindle drive axis and a rotational axis of said vehicle wheel hub;

wherein said control system is configured to utilize a measure of axial runout, together with a determined relative rotational position of said slant surfaces, to calculate a required change in said relative rotational position of said slant surfaces which will reduce said axial runout to below an acceptable threshold; and wherein said control system is configured to activate said actuation mechanism to rotationally adjust at least one of said slat surfaces relative to another of said slant surfaces to impart said required change in said relative rotational position of said slant surfaces.

7. The on-car brake lathe system of claim 6 wherein said required change in said relative rotational position is a minimum required change.

8. The on-car brake lathe system of claim 6 wherein said control system is further configured to generate for display to an operator one or more of, a representation of an amount of time required to reduce said axial runout to below said acceptable threshold based on said determined relative rotational position of said slant surfaces, each calculated required change in said relative rotational positions of said slant surfaces, an amount of change in said relative rotational position of said slant surfaces imparted by said actuation mechanism during one revolution of said aligning joint about said axis of said aligning joint, and a rotational speed of said aligning joint.

9. The on-car brake lathe system of claim 1 wherein said actuation mechanism includes:

a pawl mechanism disposed in a fixed position relative to said aligning joint, said pawl mechanism having a clockwise-engaging pawl arm and a counter-clockwise-engaging pawl arm, each of said pawl arms coupled to a linear actuator for radial linear movement relative to said aligning joint; and for each slant surface within said aligning joint, two pairs of star gears operatively engaged to rotationally drive said slant surface about said aligning joint axis, a first pair of said star gears configured to rotationally advance said slant surface in a direction of rotation of said aligning joint when engaged by one pawl arm of said pawl mechanism, and a second pair of said star gears configured to rotationally advance said slant surface opposite to said direction of rotation of said aligning joint when engaged by another pawl arm of said pawl mechanism.

10. The on-car brake lathe system of claim 9 wherein said pawl mechanism is configured to selectively engage said first and second pairs of star gears with said clockwise-engaging pawl arm by radially-inward linear movement during clockwise rotation of said aligning joint; and wherein said pawl mechanism is configured to selectively engage said first and second pairs of star gears with said counter-clockwise-engaging pawl arm by radially-inward linear movement during counter-clockwise rotation of said aligning joint.

11. The on-car brake lathe system of claim 1 wherein said plurality of slant surfaces includes a first rotationally adjustable slant disc coaxially located on said axis of said aligning joint, having a first axial face inclined at an angle relative to said axis, a second rotationally adjustable slant disc coaxially located on said axis of said aligning joint, having a second axial face inclined at an angle relative to said axis, said second axial face presented towards said first axial face, wherein a rotational orientation of said first slant disc about said axis is independently adjustable from a rotational orientation of said second slant disc about said axis, and wherein said aligning joint further includes an annular bearing disposed between said first and second rotationally adjustable slant discs.

* * * * *